United States Patent Office 2,775,071
Patented Dec. 25, 1956

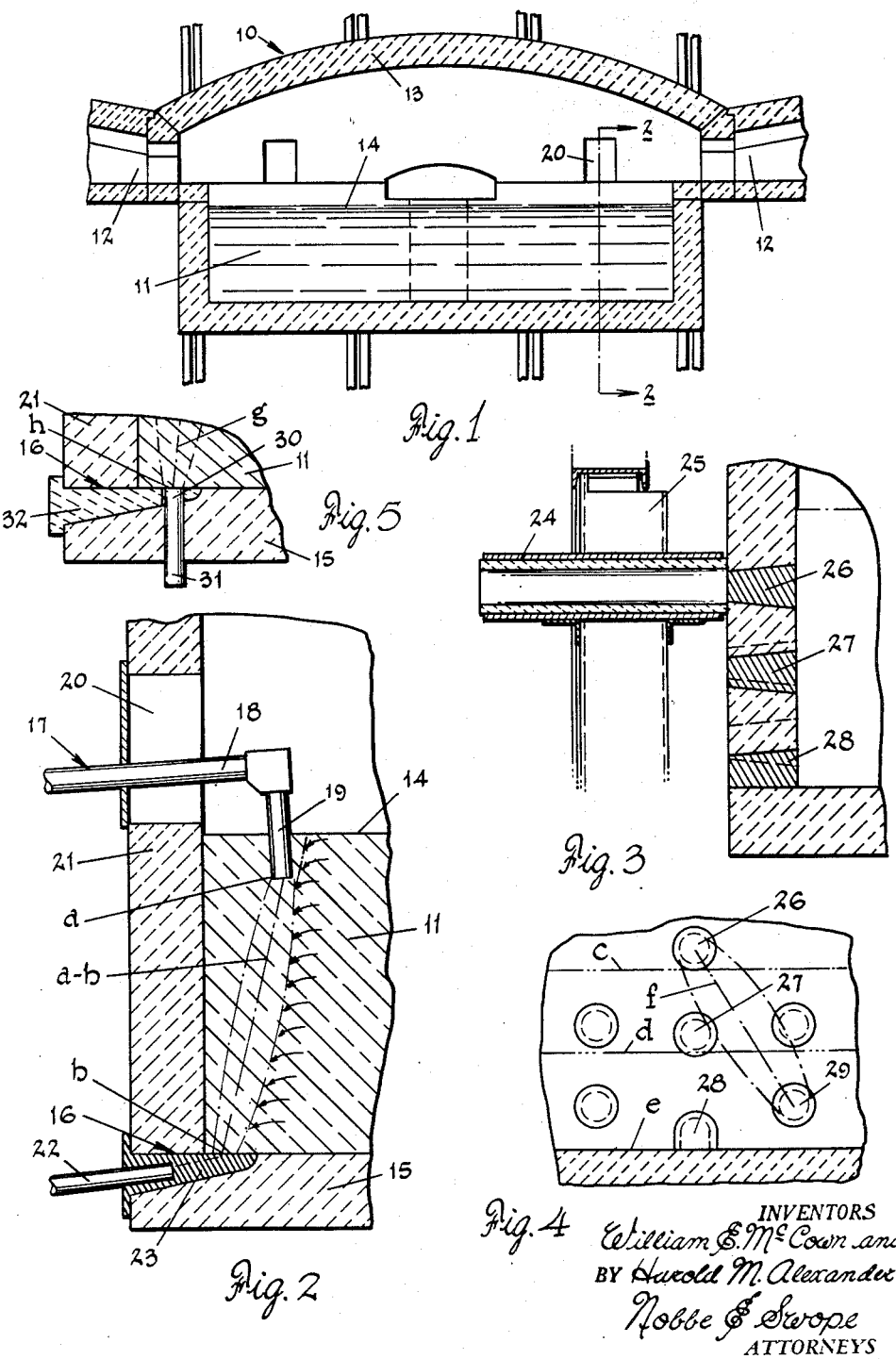

2,775,071

METHOD OF DRAINING MELTING TANKS

William E. McCown, Maumee, and Harold M. Alexander, Toledo, Ohio, assignors to Libbey-Owens-Ford Glass Company, Toledo, Ohio, a corporation of Ohio Application April 21, 1954, Serial No. 424,604

5 Claims. (Cl. 49—77)

This invention relates generally to melting tanks and more particularly to an improved method of draining such tanks when the contents thereof are partially solidified. In producing sheet glass or other glassware, the basic batch materials are fed into a melting tank wherein the temperature is maintained at the required level for fusing the batch materials into a molten fluid mass. From the melting zone of the tank, the fluid glass flows to a collecting point where it may be drawn off as a sheet or formed into mold charges, etc. for further processing. When it becomes necessary to repair or rebuild the interior of a melting tank, it is of course necessary that the class contained therein be removed. This is relatively easily accomplished in tanks used for producing ordinary window and plate glass since the condition of the glass remaining in the melting tank and to be removed therefrom is of such a nature that it is substantially fluid throughout the entire depth of the tank. When draining a tank of this nature, the tank temperature is continued at a glass melting level and a drain plug is removed from a drainage opening in the tank bottom, thereby permitting the contained fluid glass to flow therethrough. The solidified residue which ordinarily remains within the tank may be removed by shipping of other means.

However, when it is desired to drain a melting tank used in the production of certain special type glasses such as, for example, heat absorbing glasses, a different and more difficult problem is presented. The batch materials used in producing heat absorbing glasses, for example, have different properties than those used in making ordinary plate and window glass, primarily due to the relatively high iron content in the heat absorbing glasses. As a result of this iron content, the heat absorbing glasses do not pass radiant heat as well as ordinary window or plate glass and as a direct result, it is especially difficult to drain a melting tank used in producing heat absorbing glasses.

More particularly, the normal depth of glass in a continuous type melting tank is approximately three or four feet. While in the tank, this glass is kept at a fluid or semi-fluid state by applying convected heat to the refractory area above the level of the molten glass which in turn radiates heat to the glass surface. In the case of molten glass used in producing window and plate glass, the glass provides no appreciable resistance to radiated heat and the radiant heat applied at the surface is passed in sufficient quantities to the tank bottom to render the whole mass fairly fluid.

However, the poor performance of certain special type glasses such as heat absorbing glasses in passing radiant heat will not give the same results in a tank used for melting batch ingredients for this type of glass. Instead, the radiated heat is absorbed in the surface portion of the glass and since glass is a relatively good insulator, the heat in the surface portion will not be conducted downwardly through the glass in sufficient quantities to render the base portion fluid.

It will therefore be readily appreciated that a tank used for producing heat absorbing glasses cannot be drained by simply removing a plug from the tank bottom. Instead, it has heretofore been necessary to allow the glass to cool to the extent that workmen may enter the tank and remove the three or four feet of the then solidified glass by chipping or breaking away the massed glass with pneumatic air hammers or the like. While this method is both time consuming and expensive, it has heretofore been a necessary operation in removing solidified glass from a tank of this nature.

It is therefore an important object of this invention to provide a new and improved method for draining melting tanks and particularly glass melting tanks.

Another object of the invention is to provide a method whereby solidified glass in the tank may be first reduced to a fluid consistency to facilitate its removal therefrom.

A further object of the invention is to provide a method in which the glass is drained from the tank while the customary melting temperature is maintained.

Other objects and advantages of the invention will become more apparent during the course of the following description when taken in connection with the accompanying drawings.

In the drawings, wherein like numerals are employed to designate like parts throughout the same:

Fig. 1 is a transverse vertical section through a glass melting tank;

Fig. 2 is a fragmentary section taken substantially on line 2—2 of Fig. 1;

Fig. 3 is a diagrammatic showing of a spout used in flowing glass from a melting tank;

Fig. 4 is a fragmentary interior end view of a melting tank showing ports or openings from which glass may be removed; and Fig. 5 is a view similar to Fig. 2 but showing a modified form of the invention.

With reference now to the drawings, and particularly to Fig. 1, there is shown a glass melting tank 10 having contained therein a mass of molten glass 11, the surface portion of which is maintained in a fluid state by convected heat passing from the regenerator openings 12 to the refractory area between the tank roof 13 and the glass surface 14 from which it is radiated downwardly through the body of glass 11. It will be noted that the glass receives most of its heat in the form of radiation from the refractory above, and a relatively smaller amount from convection.

It is well known that glass at ordinary room temperatures acts as an insulator with respect to electricity. However, as the temperature of glass increases, its conductivity increases and at a temperature in the order of 900° F., glass becomes a relatively good conductor of electricity. Therefore, since the minimum temperature of the glass within a melting tank is usually above 900° F., it was found that if an electric current were passed from a point $a$ (Fig. 2) at the surface 14 of the body of molten glass to a point $b$ on the tank bottom 15, adjacent a drainage opening 16, the heat produced by said current passing through the glass would melt the glass along a path $a$—$b$ extending from the fluid surface portion downwardly through the body of glass to a point adjacent said drainage opening.

In carrying out this invention, a current transmitting electrode 17, comprising a body portion 18 and a tip portion 19 at substantially right angles to said body portion, is passed through an access opening or bulkhead 20 in the side wall 21 of tank 10. The tip portion 19 is then immersed in the fluid surface portion of the glass as shown in Fig. 2. An additional electrode 22, acting as a current receiving element, is then inserted through the drainage opening 16, which is shown as being located in the bottom wall 15 of the melting tank 10. Graphite or other suitable material 23, which is a good electrical conductor, is then packed in the drainage opening around the electrode 22.

A current of electricity is then caused to flow between the two electrodes. More particularly, the current travels from the top 19 of upper electrode 17 in a direct path to the nearest point *b* of the graphite packed drainage opening 16, from which it passes through the graphite to the tip of electrode 22. At such time, the temperature within the tank is maintained at the same or substantially the same level used in melting so that the heat generated by the current passing through the glass will cause the glass along path *a—b* to be reduced to a fluid state. Upon removal of the electrode 22 and the graphite 23 from opening 16, the now completely fluent column of glass *a—b* will drain through said opening, while the top portion 14 of the glass being the more fluid is next to flow off through the opened channel, being successively followed by the lower layers in descending order from the surface 14 as indicated by the arrows in Fig. 2. Once the glass begins to drain, the channel *a—b* created will remain open due to the heat of the flowing glass. During the draining of the glass from the tank the melting temperature within the tank is of course maintained so that as the depth of the glass decreases, the surface heat will reduce the successively exposed new surface portions to a fluid state so that in effect the level of glass in the tank will be gradually lowered by draining from the top of the contained body of glass.

As stated above, in order to carry out the method as described, it is necessary that the temperature of the glass at the bottom of the tank be of the order of 900° F. so that it will act as a relatively good electrical conductor. However, if the body of glass is of such a depth that the base portion thereof is not at a sufficiently high temperature to act as a reasonably good conductor, it may be necessary to partially drain off the upper portion of the glass to decrease the depth of the glass body and therefore increase the temperature of the base portion. When the temperature of the base portion reaches approximately 900° F., the above method may be employed.

This partial draining of the melting tank referred to above may be accomplished as follows. For example, a ceramic lined spout 24, shown in Fig. 3, may be used to conduct the fluid glass from the tank 10 through an opening in the side wall thereof. More specifically, the spout 24 may be adjustably mounted on a support 25 so that it may selectively receive glass from any one of several drainage openings 26, 27 or 28 formed in the side wall 21.

As shown in Fig. 4, various patterns of current flow may be produced when it is desired to only partially drain a melting tank. More particularly, if the surface of the glass is at the level *c*, and it is desired to drain the tank to the level *d* in line with the lower edge of opening 27, electrodes are introduced through drainage openings 26 and 27. A current is then passed between said electrodes to produce the required fluid channel effect to drain the tank to the level *d*. If it is desired to reduce the level from *d* to *e*, electrodes may be inserted in openings 27 and 28 and a current passed therebetween.

The method above described will of course necessitate removal of the lower electrode so that the glass may drain out the opening through which it was inserted. However, this is not necessarily the case and it has been found that inserting electrodes in openings 26 and 29 (Fig. 4) and passing an electric current therebetween will produce a fluid path *f* of such a width that the glass adjacent opening 27 will be rendered fluent and removal of the plug at that opening will allow the glass to drain therethrough. Therefore, different combinations of drainage openings at various elevations in the tank side wall may be used to partially or completely drain a melting tank.

A modified embodiment of the present invention is shown in Fig. 5 wherein the tip portion 30 of the lower electrode 31 is inserted upwardly through the bottom wall 15 of the tank adjacent the drainage opening 16 and permanently secured in place. The upper electrode 17 may be positioned as previously described. The passing of an electric current between these electrodes will produce the channel of fluid glass *g* having its lower end *h* immediately adjacent the drainage opening 16 so that upon removal of the plug 32 from the opening 16 the glass will be allowed to flow therethrough as previously described.

Should the flow of glass from the opening 16 become sluggish or begin to solidify within said opening, an electric current may again be passed between electrodes 17 and 31 and continued until the glass therebetween is again sufficiently hot to freely flow. It will be apparent that since the lower electrode 31 does not obstruct the drainage opening 16, it may remain in place at all times.

In accordance with the invention, should the molten glass within a melting tank become completely solidified, it is only necessary to apply sufficient heat to the surface portion thereof so that it becomes fluid, and then employ the novel method of this invention to completely drain the tank.

Although the invention herein described is particularly adaptable for draining a melting tank used in producing heat absorbing or other special type glasses, the same principle may be applied to draining any type of overfired melting tank or vat in which the contents have a fluid surface and a partially solidified bottom portion.

It is to be understood that the form of the invention herewith shown and described is to be taken as a preferred embodiment of the same, and that various changes may be resorted to without departing from the spirit of the invention or the scope of the subjoined claims.

We claim:

1. The method of draining substantially solidified glass from a melting tank through an opening in the tank below the surface of the glass, comprising applying heat to the glass to render the upper surface thereof fluid, creating a channel of fluid glass in the substantially solidified glass extending from the glass surface to a point adjacent to the tank opening, and causing the fluid glass to flow along said channel in said solidified glass and out of said opening.

2. The method of draining substantially solidified glass from a melting tank through an opening in the tank below the surface of the glass, comprising applying heat to the glass to render the upper surface thereof fluid, creating a channel of fluid glass extending from the glass surface through the substantially solidified glass to a point adjacent to the tank opening by resistance heating, causing the fluid surface portion of the glass to flow along said channel and out of said opening, and continuing the heating of the surface portion of the glass so that the successively appearing new surface portions are rendered fluid and will flow through the tank opening.

3. The method of draining substantially solidified glass from a melting tank through an opening in the tank located beneath the surface of the glass, which comprises heating the surface of the glass so that it will become fluid, placing an electrode in contact with said fluid surface portion, placing a second electrode in contact with the substantially solidified portion of the glass adjacent said opening, and passing an electric current between said electrodes to produce a fluid channel therebetween through which the fluid glass will flow in passing through the tank opening.

4. The method of removing substantially solidified glass having a fluid layer on the upper surface thereof from a melting tank, comprising heating the solidified glass to a temperature at which it becomes electrically conductive, passing an electric current through said fluid layer and thence through said solidified layer to render a portion of said solidified layer fluid, and draining said fluid glass through said solidified layer.

5. The method of draining substantially solidified glass from a melting tank through an opening in the tank below the surface of the glass, comprising directing flames to the upper surface of the glass to render a portion thereof fluid, creating a channel of fluid glass in the substantially solidified glass extending from the glass surface to a point adjacent the tank opening, and draining the fluid glass from the surface along the channel in the solidified glass and through said opening.

References Cited in the file of this patent
UNITED STATES PATENTS

| | | |
|---|---|---|
| 469,454 | Rogers | Feb. 23, 1892 |
| 2,186,718 | Ferguson | Jan. 9, 1940 |
| 2,215,982 | Slayter et al. | Sept. 24, 1940 |